United States Patent [19]

Ryan et al.

[11] 4,279,121

[45] Jul. 21, 1981

[54] STRANDED NICKEL BRAZE ALLOY PREFORMS

[75] Inventors: Edward J. Ryan, Wallingford; David A. Rutz, Manchester, both of Conn.; Jack W. Lee, Palm Beach Gardens, Fla.

[73] Assignee: United Technologies Corporation, Hartford, Conn.

[21] Appl. No.: 81,515

[22] Filed: Oct. 3, 1979

Related U.S. Application Data

[63] Continuation of Ser. No. 895,161, Jan. 10, 1978, abandoned.

[51] Int. Cl.³ ............... D02G 1/00; B32B 15/02; B32B 15/04
[52] U.S. Cl. ................ 57/258; 57/200; 87/1; 87/8; 148/6.3; 148/31.5; 427/419.7; 428/366; 428/379; 228/263 B
[58] Field of Search ............... 428/605, 608, 251, 366, 428/373, 379, 389, 263, 285, 369, 469; 148/31.5, 6, 6.11, 6.14 R, 6.3; 427/419 F, 419.7; 228/56, 263 B; 57/200, 258; 87/1, 8

[56] References Cited

U.S. PATENT DOCUMENTS

| | | | |
|---|---|---|---|
| 3,429,753 | 2/1969 | Wagner | 428/366 |
| 3,632,319 | 1/1972 | Hoppin et al. | 29/487 |
| 3,753,794 | 8/1973 | Paulonis et al. | 148/32 |
| 4,148,973 | 4/1979 | Sexton et al. | 428/679 |

FOREIGN PATENT DOCUMENTS

| | | | |
|---|---|---|---|
| 1237411 | 3/1967 | Fed. Rep. of Germany | 428/378 |
| 1263460 | 3/1968 | Fed. Rep. of Germany | 228/156 |
| 2263491 | 7/1973 | Fed. Rep. of Germany | 148/6.3 |

OTHER PUBLICATIONS

"Compositions, Properties and Applications for Nicrobraz Filler Metals", NICROBRAZ Engineering Data Sheet No. 2.1.1, Rev. F (1972).

Miller, F., "A New Look at the Boron Filler Alloys", *The Tool and Manufacturing Engineer* pp. 1-4 of reprinted article (10/63).

Chang, W. H., "Basic Characteristics of Some Heat-Resisting Brazing Filler Materials", reprinted from The Welding Journal Research Supplement (9/68) pp. 1-13.

Duvall, D. S. et al., TLP* Bonding: A New Method For Brazing Heat Resistant Alloys", *Welding Journal* pp. 203-214, (4/74).

*Primary Examiner*—Michael L. Lewis
*Attorney, Agent, or Firm*—Charles E. Sohl

[57] ABSTRACT

Fabrication techniques for making nickel boron stranded wire braze preforms are described. The techniques involve the provision of the wire material in a stranded form having a large surface to volume ratio. This general form consists of a plurality of fine wires, having the desired cross-sectional area, which may be twisted or braided to produce the preform.

4 Claims, No Drawings

STRANDED NICKEL BRAZE ALLOY PREFORMS

This is a continuation of application Ser. No. 895,161, filed Apr. 10, 1978, now abandoned.

BACKGROUND OF THE INVENTION

1. Field of the Invention

This invention relates to nickel base brazing materials for high temperature applications.

2. Description of the Prior Art

It is well known in the prior art to join nickel base alloys using nickel base brazing compositions. The journal *Metal Progress*, Apr. 1977, Vol. 112, shows a representative listing of such brazing alloys on page 65. The common feature of such alloys is the use of effective melt depressants such as boron and silicon. Of these, boron is the most effective melt depressant but, homogeneous nickel alloys containing significant amounts of boron are so brittle that they cannot be fabricated into useful shapes and must be used in powder form. U.S. Pat. No. 3,753,794 describes a method for producing ductile nickel boron braze materials. This patent is incorporated herein by reference. The method of the patent involves providing the braze filler alloy in a ductile boron free form, working the ductile alloy into foil form and then adding the required amount of boron by a boriding process. The boriding process produces a thin boron rich surface layer which although extremely brittle, adheres to the ductile substrate even when subjected to minor mechanical strains. However, for many applications, a wire preform is desired and this wire preform is often subjected to severe mechanical strains. Borided wires of diameters greater than about 0.030 inch are found to be subject to spallation of the borided surface layer when strained. Accordingly, it is an object of this invention to provide a ductile nickel boron braze wire material which is not subject to spallation even when subjected to severe bending and melts adequately.

SUMMARY OF THE INVENTION

Nickel-boron braze alloys are produced in wire form having a total cross-sectional area greater than about 0.001 square inch in combination with a surface to volume ratio in excess of about 100. This combination of surface area and surface to volume ratio is achieved by providing a plurality of fine braze wires which may be twisted or braided to produce the preform. The wire strands are provided in ductile form and then borided. By providing a surface area much in excess of that which would exist in a unitary wire of the same cross-sectional area, the depth of the borided surface layer is reduced to less than the depth at which spallation becomes a problem. In addition, by providing a plurality of smaller diameter wires, the strains during bending are reduced over the strains which would be encountered in a single wire of the same cross section. It has been determined that boron levels in excess of those levels used in normal braze alloys is preferred.

The foregoing and other objects, features and advantages of the present invention will become more apparent in the light of the following detailed description of preferred embodiments.

DESCRIPTION OF PREFERRED EMBODIMENTS

It is desirable to produce nickel boron braze alloys in wire form by boriding the surface layer of the wire to provide the desired boron level after the ductile boron free alloy has been drawn to wire. The borided surface layer, however, is extremely brittle and spallation of the brittle surface layer is encountered when the braze wire is bent or otherwise shaped. Spallation is an increasingly serious problem as the wire diameter increases. This spallation problem is related to two factors. The first and most important factor is that relatively thicker borided surface layers are required on larger wires to achieve the same overall boron content as that achieved on small wires. The required thickness of the surface layer is related to the surface to volume ratio. The second factor which contributes to the problem is that the strain at the surface of the wire during bending increases with increasing wire size, assuming a consistent bend radius.

For a wire of circular cross section, the ratio of surface area to volume is given by the relation $$(S/V) = (4/d)$$

where S is surface area, V is volume, and d is diameter.

Table I shows the ratio of surface area to volume and the cross-sectional area for several sizes of circular and square wires. It can be seen that the ratio of surface area to volume decreases with increasing wire size while the cross-sectional area obviously increases with increasing wire size.

TABLE I

| Size, Diameter or Thickness | Circular | | Square | |
|---|---|---|---|---|
| | Surface Volume in$^{-1}$ | Cross Section in$^2$ | Surface Volume in$^{-1}$ | Cross Section in$^2$ |
| .010 | 400 | $7.8 \times 10^{-5}$ | 400 | $1 \times 10^{-4}$ |
| .020 | 200 | $3.1 \times 10^{-4}$ | 200 | $4 \times 10^{-4}$ |
| .030 | 133 | $7.1 \times 10^{-4}$ | 133 | $9 \times 10^{-4}$ |
| .040 | 100 | $1.2 \times 10^{-3}$ | 100 | $1.6 \times 10^{-3}$ |
| .050 | 80 | $1.9 \times 10^{-3}$ | 80 | $2.5 \times 10^{-3}$ |

It has been determined that to provide an adequate amount of braze material to fill a typical joint, the cross-sectional area of the preform must exceed about 0.001 square inch. At the same time, however, it has also been determined that the ratio of surface to volume for the preform must exceed about 100 if spallation is to be avoided. From Table I, it appears that these requirements cannot be satisfied by either circular or square wires. This invention resolves these conflicting requirements by providing braze wire preforms in the form of a plurality of fine wire strands having a total cross-sectional area in excess of about 0.001 square inch and preferably in excess of 0.0015 square inch. Each of the fine wires has a surface to volume ratio in excess of 100 and preferably in excess of 150. These wire strands are preferably twisted, braided or woven together to form the preform. The wires may be borided before or after they are joined together. The possibility of wires having circular and square cross sections has been mentioned previously and it will be appreciated that the concept of this invention is generally applicable to wires of any cross-sectional shape. It will also be appreciated that not all of the strands need have that same shape or size.

Evaluation tests of nickel boron braze material in wire form show the advisability of increasing the boron content to assure complete melting. Table II shows examples of two known braze alloy compositions, AMS 4777 and AMS 4778. In the case of AMS 4777, it was found desirable to increase the boron content from the established range of 2.5–3.5% boron to a new range of 3.5–4% boron. In the case of AMS 4778, the boron level was changed from the original range of 2.2–3.5% boron to a new range of 3.0–3.5% boron. When the location and concentration of boron in a braze filler alloy are varied (as in this invention), a departure from the normal melting kinetics will be experienced. When boron is incorporated in the alloy as a coating, melting is controlled by the diffusion of boron into the wire core. A longer period of time is required to achieve complete melting of the wire while the diffusion of boron progresses at a normal rate from the liquid braze alloy into the parts being joined and this requires some additional boron in borided type wire braze filler materials.

TABLE II

|  | AMS 4777 | AMS 4778 |
| --- | --- | --- |
| Carbon | 0.50 Max | 0.06 Max |
| Silicon | 3.0–5.0 | 4.0–5.0 |
| Chromium | 6.8–8.0 | — |
| Iron | 2.0–4.0 | 1.5 Max |
| Boron | 2.5–3.5 | 2.2–3.5 |
| Nickel | Balance | Balance |

Many alternative embodiments, which do not depart from the invention, will occur to the skilled artisan. These alternatives include the use of silicon as a melt depressant; silicon can be deposited by a process analogous to boriding and will result in a brittle surface layer. It is also possible to incorporate minor amounts of silicon and/or boron in the braze alloy without completely eliminating ductility. Such incorporation of minor amounts of melt depressant in the bulk alloy will reduce the amount of melt depressant which must be applied in the surface layer.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A nickel alloy braze preform which comprises a plurality of fine wire strands, which are mechanically held in proximity to each other by twisting or braiding the strands together to form a stranded preform, each of said strands having a boride surface layer, the total cross-sectional area of the strands being in excess of about 0.0015 square inch and the ratio of surface area to volume of the plurality of strands being in excess of about 100 in$^{-1}$, said stranded preform being used in place of a single borided wire (which would have a particular cross-sectional area and boride surface layer thickness) said plurality of strands having a cross-sectional area essentially equal to the cross-sectional area of said single wire, while having an increased surface area relative to that of the single wire, so that the depth of the borided layer may be reduced, while maintaining the total boron level equal to or in excess of the single boride wire, so that stranded preform has the ability to withstand bending strands without significant spallation of the borided surface layer.

2. A preform as in claim 1 having an overall boron content in excess of the boron content of a comparable braze alloy.

3. A preform as in claim 1 having an overall composition of up to about 0.5% carbon, from about 3 to about 5% silicon, from about 6.8 to about 8% chromium, from about 2 to about 4% iron, from about 3.5 to about 4% boron, balance essentially nickel.

4. A preform as in claim 1 having an overall composition of up to about 0.06% carbon, from about 4 to about 5% silicon, up to about 1.5% iron, from about 3 to about 3.5% boron, balance essentially nickel.

* * * * *